(12) United States Patent
Gao et al.

(10) Patent No.: US 9,775,059 B2
(45) Date of Patent: Sep. 26, 2017

(54) METHOD OF AND APPARATUS FOR INTERFACE MEASUREMENT IN COORDINATED MULTIPOINT TRANSMISSION

(75) Inventors: Qiubin Gao, Beijing (CN); Wenhong Chen, Beijing (CN)

(73) Assignee: CHIN ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 281 days.

(21) Appl. No.: 14/113,217

(22) PCT Filed: Mar. 28, 2012

(86) PCT No.: PCT/CN2012/073199
§ 371 (c)(1),
(2), (4) Date: Nov. 19, 2013

(87) PCT Pub. No.: WO2012/142901
PCT Pub. Date: Oct. 26, 2012

(65) Prior Publication Data
US 2014/0066116 A1   Mar. 6, 2014

(30) Foreign Application Priority Data
Apr. 22, 2011   (CN) .......................... 2011 1 0102149

(51) Int. Cl.
*H04B 7/00* (2006.01)
*H04W 24/08* (2009.01)
(Continued)

(52) U.S. Cl.
CPC .......... *H04W 24/08* (2013.01); *H04B 17/345* (2015.01); *H04L 5/0035* (2013.01);
(Continued)

(58) Field of Classification Search
CPC .............................. H04W 24/08; H04W 72/04
See application file for complete search history.

(56) References Cited

U.S. PATENT DOCUMENTS

2012/0213261 A1* 8/2012 Sayana ................. H04L 5/0094
375/224

FOREIGN PATENT DOCUMENTS

CN  101227445 A  7/2008
CN  101848485 A  9/2010
(Continued)

OTHER PUBLICATIONS

International Search Report for PCT/CN2012/073199, Jul. 5, 2012.
(Continued)

*Primary Examiner* — Mohammed Rachedine
(74) *Attorney, Agent, or Firm* — Kilpatrick Townsend & Stockton LLP

(57) ABSTRACT

The present application discloses a method of and apparatus for interference measurement in coordinated multipoint transmission so as to enable a user equipment to report corresponding channel state information accurately with respect to different interference sources. In the method according to an embodiment of the invention, the network side configures a user equipment with a plurality of sets of REs for interference measurement with respect to different interference sources and instructs the user equipment to select a set of REs for interference measurement adapted to an actual application environment to perform interference measurement, and as such in CoMP transmission, the user equipment can report channel state information with respect to the different interference sources accurately according to a network environment, so that the network side can gain timely knowledge of a change in network environment, thus
(Continued)

accommodating a demand of CoMP transmission and further improving the performance of the system.

20 Claims, 12 Drawing Sheets

(51) Int. Cl.
| | | |
|---|---|---|
| *H04W 24/10* | (2009.01) | |
| *H04W 72/04* | (2009.01) | |
| *H04B 17/345* | (2015.01) | |
| *H04W 28/04* | (2009.01) | |
| *H04W 48/08* | (2009.01) | |
| *H04B 7/024* | (2017.01) | |
| *H04J 11/00* | (2006.01) | |
| *H04L 5/00* | (2006.01) | |

(52) U.S. Cl.
CPC ........... *H04L 5/0048* (2013.01); *H04W 24/10* (2013.01); *H04W 72/04* (2013.01); *H04B 7/024* (2013.01); *H04J 11/0023* (2013.01); *H04L 5/0057* (2013.01); *H04L 5/0073* (2013.01); *H04W 28/048* (2013.01); *H04W 48/08* (2013.01)

(56) References Cited

FOREIGN PATENT DOCUMENTS

| CN | 101998453 A | 3/2011 |
|---|---|---|
| CN | 102149124 A | 8/2011 |

OTHER PUBLICATIONS

Extended European Search Report regarding the EP counterpart application 12773763.3, Oct. 9, 2014.

CATT: "Interference Measurement over Muted RE", 3GPP DRAFT; R1-110049., 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; Jan. 17, 2011, Jan. 11, 2011 (Jan. 11, 2011), XP050490028, [retrieved on Jan. 11, 2011] * sections 2 and 3 *.

LG Electronics: "RE muting design and considerations", 3GPP Draft; R1- 104649 RE Muting Design and Considerations, 3rd Generation Partnership Project (3GPP), Mobile Competence Centre; 650, Route Des Lucioles ; F-06921 Sophia-Antipolis Cedex ; France, vol. Ran WG1, No. Madrid, Spain; Aug. 23, 2010, Aug. 17, 2010 (Aug. 17, 2010), XP050449929, [retrieved on Aug. 17, 2010] * sections 2 and 3 *.

* cited by examiner

METHOD OF AND APPARATUS FOR INTERFACE MEASUREMENT IN COORDINATED MULTIPOINT TRANSMISSION

This application is a US National Stage of International Application No. PCT/CN2012/073199, filed on Mar. 28, 2012, designating the United States and claiming the benefit of Chinese Patent Application No. 201110102149.7, filed with the Chinese Patent Office on Apr. 22, 2011 and entitled "Method of and apparatus for interference measurement in coordinated multipoint transmission", which is hereby incorporated by reference in its entirety.

FIELD OF THE INVENTION

The present invention relates to the field of communications and particularly to a method of and apparatus for interference measurement in coordinated multipoint transmission.

BACKGROUND OF THE INVENTION

In a wireless cellular network system, each cell typically includes a base station in communication with a user equipment. Types of user equipments include a mobile phone, a notebook, a PDA, etc. Before a data transmission process is started, the base station will transmit a reference signal (e.g., a pilot signal) to the user equipment, and the user equipment will derive a channel estimation value from the reference signal. The reference signal is a known sequence of signals transmitted at a specific time instant and at a specific frequency as prescribed, and the quality of channel estimation will be influenced by interference, noise and other factors.

Typically the user equipment is located at different geographical locations where there may be different received signal strengths as well as noise and interference strengths. Thus some user equipment can communicate at a higher rate, e.g., a user equipment located at the center of the cell, and some other user equipments can communicate only at a lower rate, e.g., a user equipment located at the edge of the cell. Data is transmitted to the user equipment preferably in a format matching a channel condition of the user equipment in order to make full use of a transmission bandwidth of the user equipment. A technology to match a format in which data is transmitted to the user equipment with a channel condition of the user equipment is referred to as link adaptation.

In a system with use of the technology of Orthogonal Frequency Division Multiplexing (OFDM), a plurality of OFDM symbols can be transmitted concurrently over different sub-carriers. The frequency spacing between the sub-carriers can exactly ensure them to be orthogonal to each other. An OFDM modulator converts an input data symbol stream into a plurality of parallel data symbol streams through serial-to-parallel conversion. The sub-carriers on both sides of a bandwidth are precluded from data transmission and referred to as guard bandwidths. Data symbols over some sub-carriers in the range of the data bandwidth will be designed as symbols known to a receiver, and the symbols over these sub-carriers are referred to as pilot symbols from which the receiver can estimate channel information for the purpose of coherent demodulation.

The technology of Orthogonal Frequency Division Multiple Access (OFDMA) is an OFDM-based multiple access transmission technology. A frequency resource in a system bandwidth is divided into resource blocks of a specific size, and each resource block is the smallest resource unit of resource allocation in the frequency domain. The OFDMA system schedules different user equipments onto different resource blocks in the range of the system bandwidth for the purpose of orthogonal transmission between users.

The OFDMA technology is adopted in the downlink by the 3rd Generation Partnership Project (3GPP) for Long Term Evolution (LTE), where an OFDM symbol is the smallest granularity of a resource per sub-frame (1 ms) in the time domain, and each sub-frame includes 12 or 14 OFDM symbols. A sub-carrier is the smallest granularity of in the frequency domain. The smallest time-frequency unit is defined as an elementary resource unit, i.e., a Resource Element (RE). A physical Resource Block (PRB) is defined as the smallest resource allocation unit in an LTE system. A PRB includes REs corresponding to 12 consecutive sub-carriers over all of OFDM symbols in a sub-frame. A user equipment may be scheduled onto consecutive or nonconsecutive physical resource blocks.

In order to assist the base station in link adaptation, the user equipment needs to report a Channel Quality Indicator (CQI) according to a channel condition thereof. The CQI reported by the user equipment corresponds to a specific time-frequency resource. The CQI represents a transmission capacity over the time-frequency resource. The CQI needs to be calculated by the user equipment measuring undergone interference I and noise power $N_0$. For example, a straightforward CQI calculation formula is:

$$CQI = Q\left(\frac{P}{I+N_0}\right), \quad \text{Formula 1}$$

Where P is received signal power of the user equipment, and $Q(\cdot)$ is a quantization function; and in practice, the user equipment may measure the sum of $I+N_0$.

In the prior art, the technology of coordinated multipoint transmission refers to coordination between a plurality of geographically separated transmission points. Typically the plurality of transmission points refer to base stations of different cells or a plurality of base stations in the same cell. The technology of coordinated multipoint transmission is categorized into downlink coordinated transmission and uplink joint reception. A solution to the technology of downlink coordinated multipoint transmission is primarily categorized into coordinated scheduling and joint transmission.

Coordinated scheduling refers to that the respective base stations coordinate time, frequency and space resources between the cells to allocate mutually orthogonal resources for different User Equipments (UEs) to thereby avoid mutual interference. Inter-cell interference is a predominant factor restricting the performance of a UE at the edge of a cell, and inter-cell interference can be lowered through coordinated scheduling to thereby improve the performance of the UE at the edge of a cell. Referring to FIG. 1, for example, coordinated scheduling of three cells can schedule three UEs possibly interfering with each other onto mutually orthogonal resources to thereby effectively avoid interference between the cells.

Joint transmission refers to concurrent transmission of data in a plurality of cells to a UE to thereby enhance a received signal of the UE. Referring to FIG. 2, for example, data is transmitted in three cells to the same UE over the same resource, and the UE receives signals of the plurality of cells concurrently. On one hand, superposition of the useful signals from the plurality of cells can improve the quality of the signals received by the UE. On the other hand, interference to which the UE is subjected can he lowered to thereby improve the performance of the system.

In order to effectively support coordinated multipoint transmission, the user equipment also needs to estimate channel state information of a coordinating cell base station to the user equipment in addition to a serving cell. Taking a Long Term Evolution-Advanced (LTE-A) system as an example, channel state information is estimated in the LTE-A system by measuring a pilot. For example, an assumed mapping relationship between measurement pilots and data in a PRB is as illustrated in FIG. 3, where the first two OFDM symbols are configured to transmit control information, and a data region starts from the third OFDM symbol. The data region includes REs for transmitting measurement pilots (simply pilot REs) and REs for transmitting data (simply data REs, i.e., PDSCH REs illustrated in FIG. 3). In a practical application, measurement pilots used by adjacent cells are typically mapped onto different REs because the pilot REs typically have high power and are transmitted throughout the bandwidth and there is strong interference between the measurement pilots mapped onto the same RE, thus degrading the precision of channel estimation. As illustrated in FIG. 3, for example, in a cell 1, the user equipment needs to perform channel estimation on REs corresponding to measurement pilots in a cell 2 and a cell 3 to thereby obtain channel state information of the cell 2 and the cell 3, and on these REs, downlink data transmission may possibly be scheduled in the cell 1, for example, data may be transmitted over a Physical Downlink Shared Channel (PDSCH), and as such the measurement pilots transmitted in the cell 2 and the cell 3 may be subjected to interference from data transmission in the cell 1. That is, although the user equipment is located in the cell 1, the data transmitted in the cell 1 may still be inference to the user equipment estimating channels of the cell 2 and the cell 3, and thus for the user equipment in the cell 1, the strength of its received signal of the cell 1 is typically far above the strengths of signals of the cell 2 and the cell 3 so that the user equipment in the cell 1 obtains the measurement pilots of the cell 2 and the cell 3 at a low Signal to Interference and Noise Ratio (SINR) and can not obtain satisfactory precision of channel estimation.

In view of the foregoing problem, in the prior art, the REs on which the cell 2 and the cell 3 transmit the measurement pilots can be left blank, that is, have null data transmitted, in the cell 1, and this solution is referred to RE muting. Referring to FIG. 4, for example, the REs on which the cell 2 and the cell 3 transmit the measurement pilots are set to REs for muting (simply MUTING REs) in the cell 1.

Since the user equipment needs to estimate interference to the serving cell from an adjacent cell to thereby feed back channel state information (generally a CQI), and in the RE muting solution, interference, from the adjacent cell, at the locations of the measurement pilots in the serving cell has been cancelled (for example, no data is transmitted in the cell 2 and the cell 3 in the REs on which the measurement pilots are transmitted in the cell 1), interference calculated by the user equipment at the locations of the measurement pilots in the serving cell is far below actually undergone interference. Referring to FIG. 5 and FIG. 6, for example, it is assumed that three cells as illustrated in FIG. 5 are configured with MUTING REs, and measurement pilots of the three cells are structured as illustrated in FIG. 6. The cell 1 has those REs left blank which "collide" with the measurement pilots of the cell 2 and the cell 3 and on which no data is transmitted. The user equipment in the cell 1 can estimate channel status of the cell 2 and the cell 3 on the blank REs to thereby avoid interference from the cell 1, so the precision of channel estimation by the user equipment for the cell 2 and the cell 3 can be thus improved. This is beneficial to Coordinated Multipoint (CoMP) transmission because channel state information of the adjacent cell to the user equipment needs to be obtained for CoMP transmission.

However in the prior art, the UE may perform channel estimation with respect to an interference source variable with a changing application scenario, including but not limited to the following several situations:

For example, in the situation of joint transmission, all of cells in a measurement set may transmit useful signals to the UE, and at this time, interference to the UE may originate only from other than the measurement set, and the UE shall calculate and feed back channel state information only from interference of cells other than the measurement set.

In another example, due to the use of a dedicated demodulation pilot, the UE can have its transmission scheme switched dynamically between single cell transmission and CoMP transmission, and as a result of actual scheduling, some UE configured in the CoMP mode may need to perform single cell transmission and thus has to report a CQI of single cell transmission. At this time, interference to the UE may originate from other than the serving cell.

In still another example, in some CoMP transmission schemes, a coordinating cell with strong interference to the UE may avoid interference to the UE by keeping silent. The silence of the coordinating cell may have the level of interference to the UE significantly changed to thereby degrade the precision of CQI estimation, and the UE reporting a CQI can not determine whether the coordinating cell is silent. Thus a conservative practice is to have the UE calculate and report the CQI respectively for both interference situations.

In view of this, due to the introduction of the CoMP technology, the UE may perform channel estimation and further calculate CQIs possibly with respect to different interference sources in different application scenarios, and consequently the existing RE configuration solution may have to calculate interference with respect to the different interference sources, so that the UE has to estimate interference respectively for these interference sources. The invention proposes a solution to this demand.

SUMMARY OF THE INVENTION

Embodiments of the invention provide a method of and apparatus for interference measurement in multipoint coordinated transmission so as to enable a user equipment to report corresponding channel state information accurately with respect to different interference sources.

Particular technical solutions according to the embodiments of the invention are as follows:

A method of interference measurement in coordinated multipoint transmission, the method including:

obtaining, by a first apparatus, at least two sets of REs for interference measurement for a user equipment served by the first apparatus, wherein each set of REs for interference measurement corresponds to an interference source; and transmitting, by the first apparatus, configuration information of the at least two sets of REs for interference measurement to the user equipment so that the user equipment performs interference measurement according to the at least two sets of REs for interference measurement.

A method of interference measurement in coordinated multipoint transmission, the method including:

receiving, by a user equipment, configuration information of at least two sets of REs for interference measurement transmitted from a first apparatus serving the user equipment, wherein each set of REs for interference measurement corresponds to an interference source; and performing, by the user equipment, interference measurement according to the at least two sets of REs for interference measurement.

An apparatus for interference measurement in coordinated multipoint transmission, the apparatus including:

an obtaining unit configured to obtain at least two sets of REs for interference measurement for a user equipment served by the apparatus, wherein each set of REs for interference measurement corresponds to an interference source; and a communicating unit configured to transmit configuration information of the at least two sets of REs for interference measurement to the user equipment so that the user equipment performs interference measurement according to the at least two sets of REs for interference measurement.

An apparatus for interference measurement in coordinated multipoint transmission, the apparatus including:

a communicating unit configured to receive configuration information of at least two sets of REs for interference measurement transmitted from a first apparatus serving the apparatus, wherein each set of REs for interference measurement corresponds to an interference source; and a measuring unit configured to perform interference measurement according to the at least two sets of REs for interference measurement.

In the embodiments of the invention, the network side configures a user equipment with a plurality of sets of REs for interference measurement with respect to different interference sources and instructs the user equipment to select a set of REs for interference measurement adapted to an actual application environment to perform interference measurement, and as such in CoMP transmission, the user equipment can report channel slate information with respect to the different interference sources accurately according to a network environment, so that the network side can gain timely knowledge of a change in network environment, thus accommodating a demand of CoMP transmission and further improving the performance of the system.

DETAILED DESCRIPTION OF THE EMBODIMENTS

In coordinated multipoint transmission, in order to enable a UE to report corresponding channel state information accurately with respect to different interference sources, in an embodiment of the invention, a first apparatus at the network side configures a plurality of (at least two) sets of REs for interference measurement for a user equipment served by the first apparatus, where each set of REs for interference measurement corresponds to an interference source, and the first apparatus transmits configuration information of the configured at least two sets of REs for interference measurement to the user equipment in a serving cell, and the user equipment performs interference measurement according to the at least two sets of REs for interference measurement obtained from the first apparatus and further reports corresponding channel state information according to measurement results.

Figure 1:
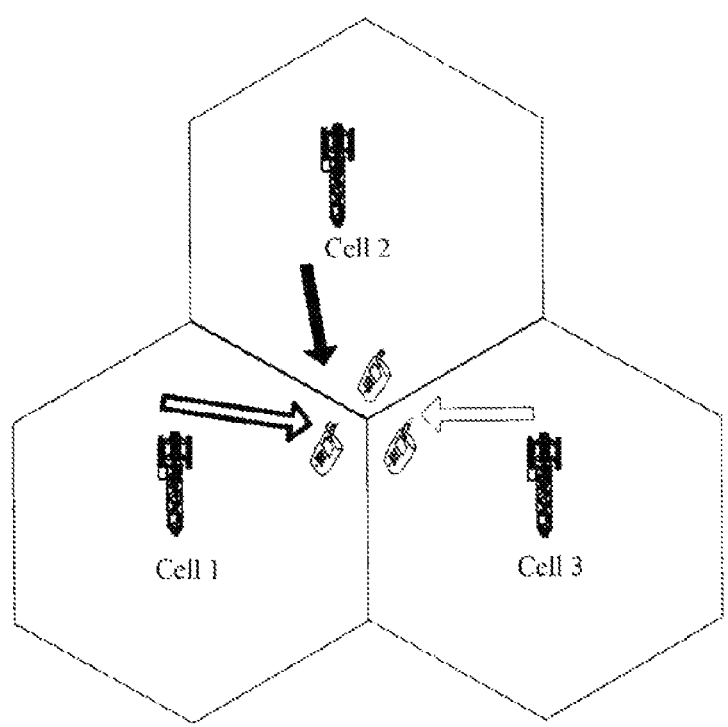
FIG. 1 is a schematic diagram of the coordinated scheduling mode in the technology of multipoint coordinated transmission in the prior art.
Figure 2:
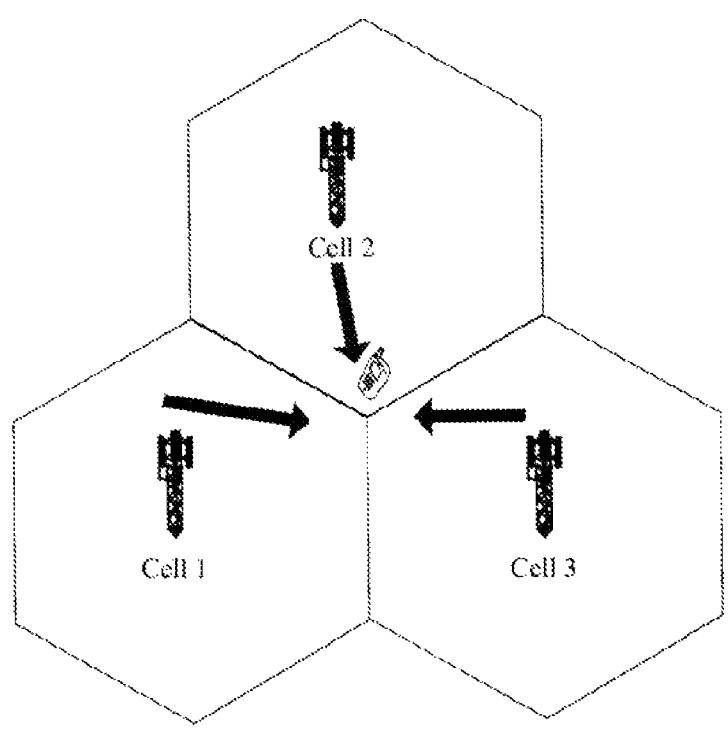
FIG. 2 is a schematic diagram of the joint transmission mode in the technology of multipoint coordinated transmission in the prior art.
Figure 3:
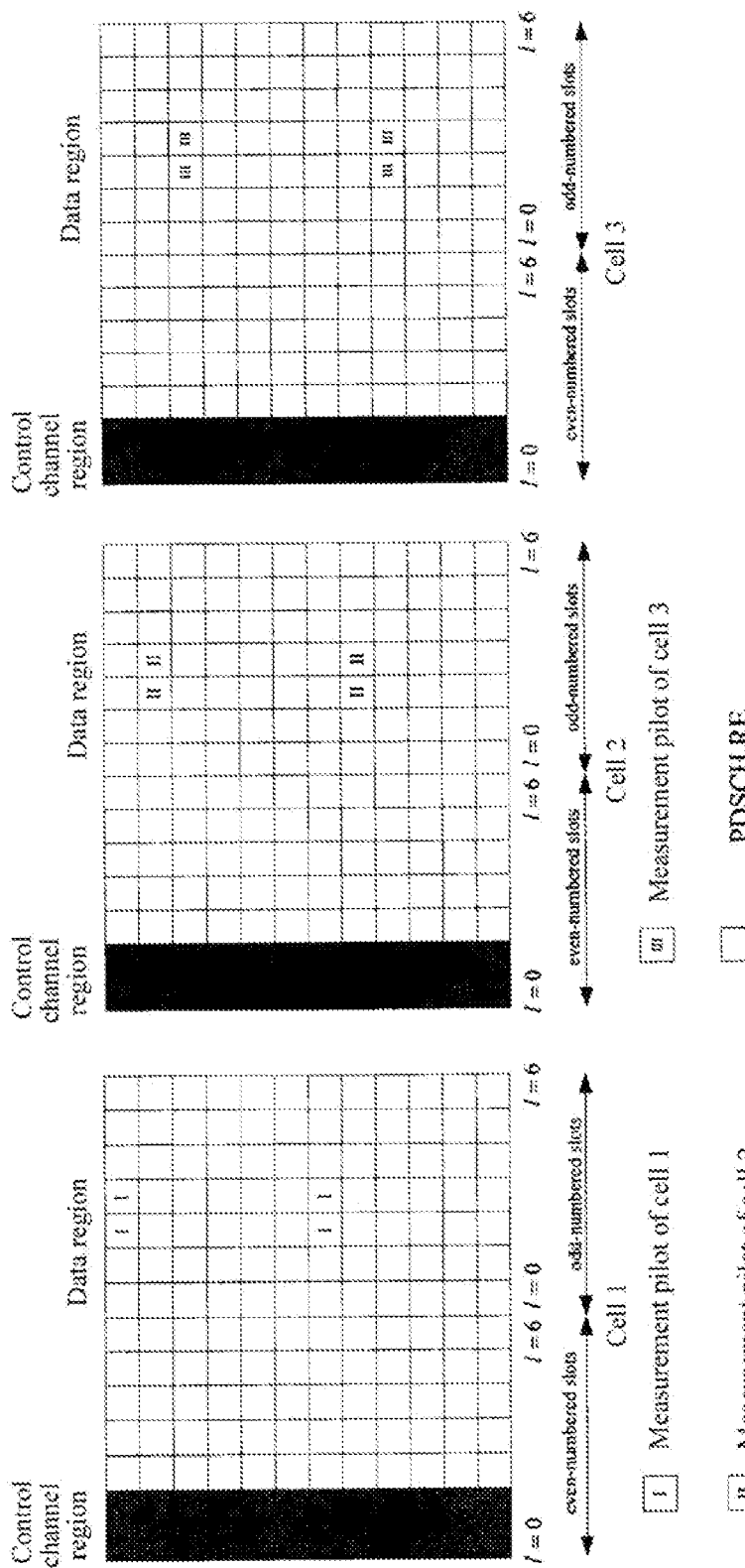
FIG. 3 is a schematic diagram of RE configuration in the general solution in the prior art.
Figure 4:
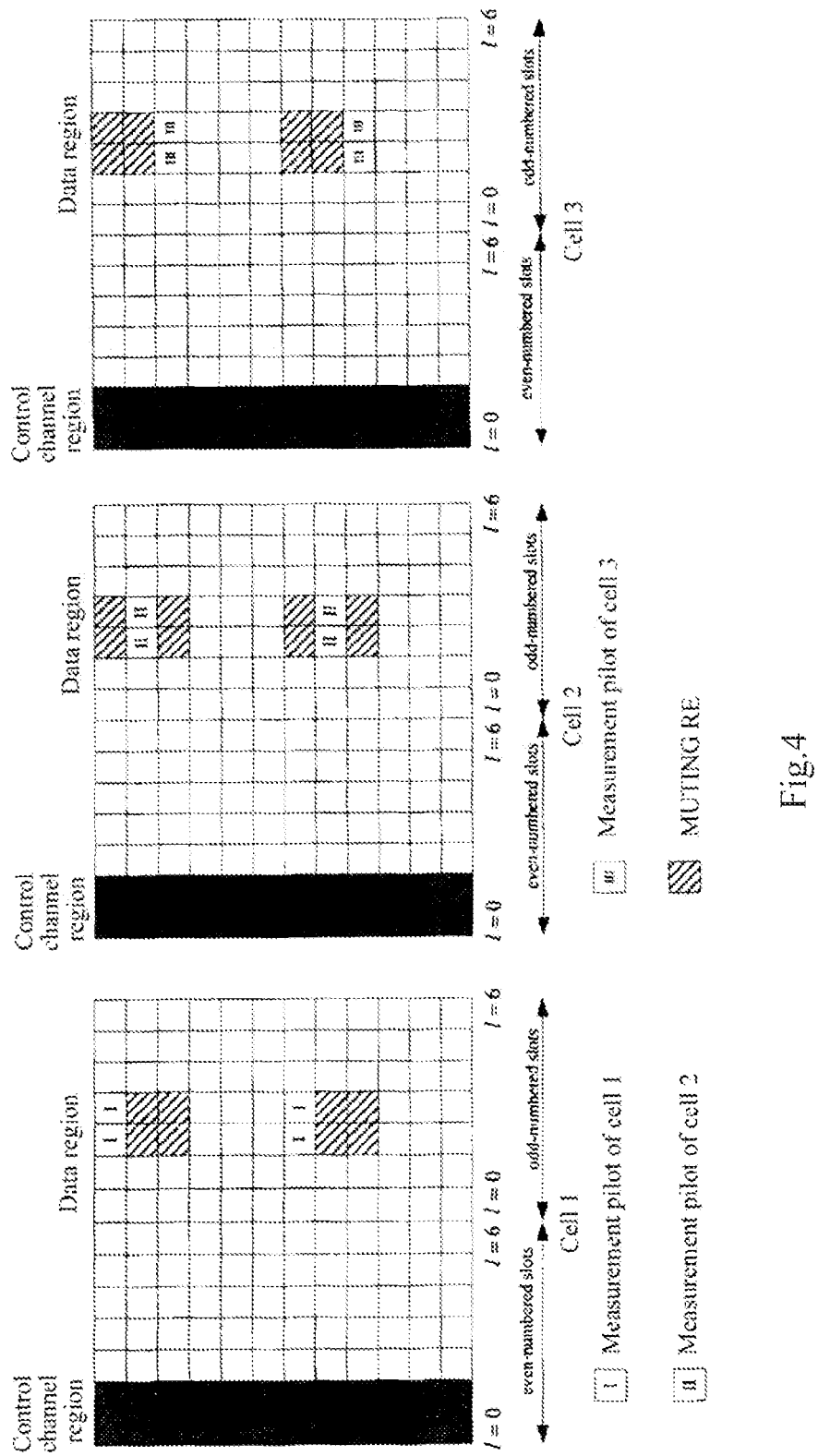
FIG. 4 is a schematic diagram of RE configuration in the muting solution in the prior art.
Figure 5:
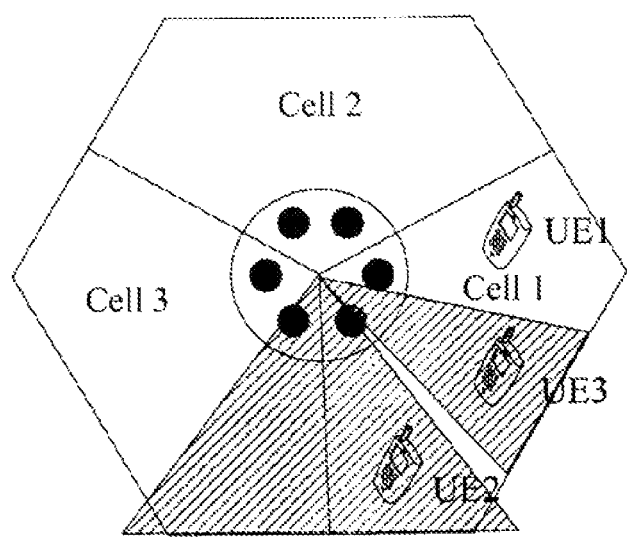
FIG. 5 and FIG. 6 are a schematic diagram of cell distribution and a schematic diagram of corresponding RE configuration in the prior art.
Figure 6:
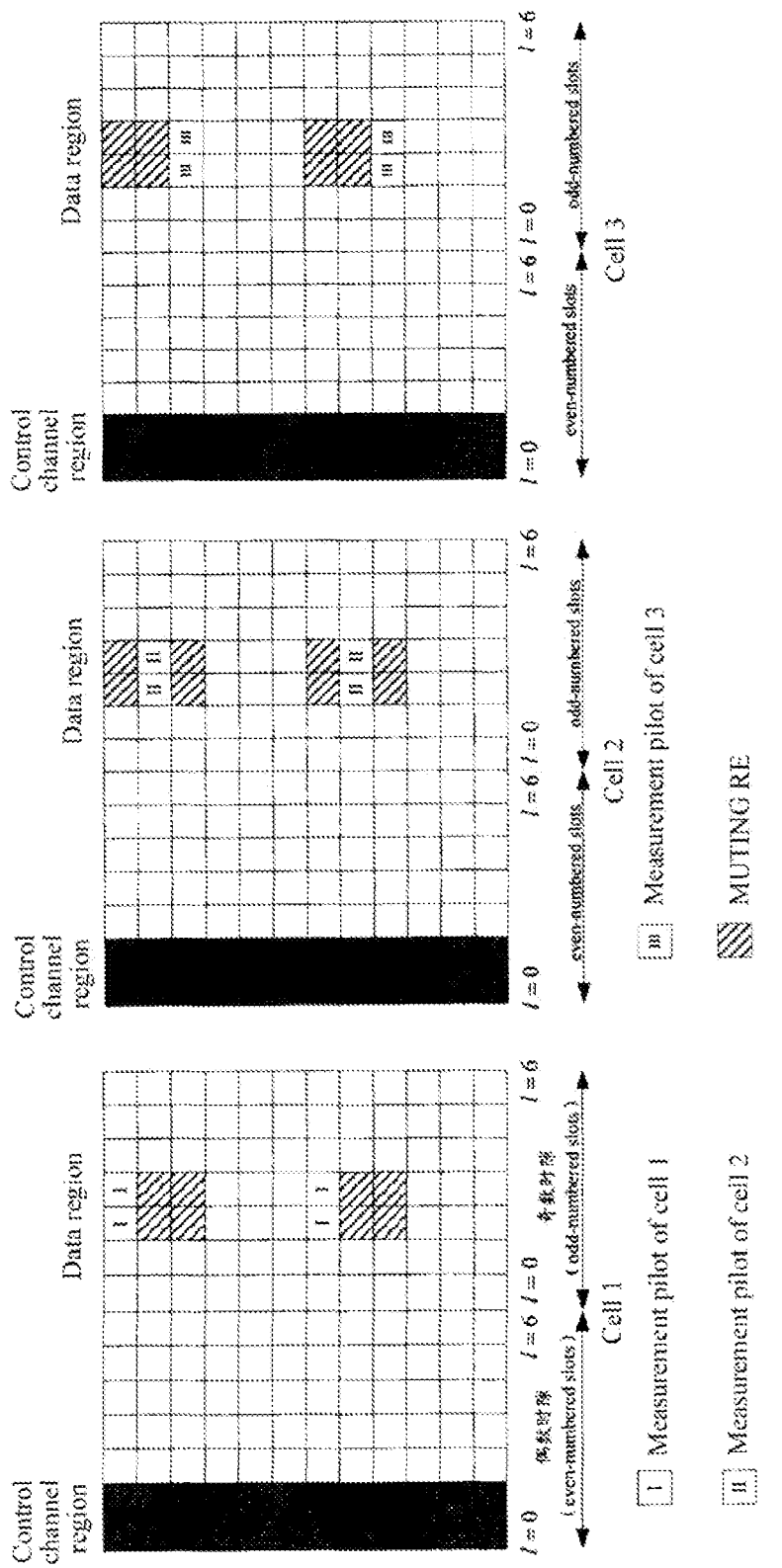

In this embodiment, the first apparatus sets the at least two sets of REs for interference measurement for the user equipment served by the first apparatus particularly as follows;

The first apparatus determines a measurement set of the user equipment, where the measurement set includes the first apparatus transmitting service data to the user equipment and at least one second apparatus participating in coordinated multipoint transmission (which may be coordinated scheduling or joint transmission) to the user equipment and then sets the at least two sets of REs for interference measurement according to the various interference sources corresponding to the measurement set, so that the user equipment can perform interference measurement on REs included in the at least two sets of REs for interference measurement, that is, the user equipment determines that the first apparatus transmits no data or only measurement pilots on the REs included in the at least two sets of REs for interference measurement, so the user equipment can perform interference measurement thereon; and the foregoing respective apparatus (including the first apparatus and the second apparatus) can be base station devices belonging to the same cell or base station devices belonging to a plurality of cells. This embodiment will be described below in details only by way of an example in which the first apparatus corresponds to a cell and two second apparatuses correspond to a cell 2 and a cell 3 respectively as illustrated in FIG. 5.

Figure 7:
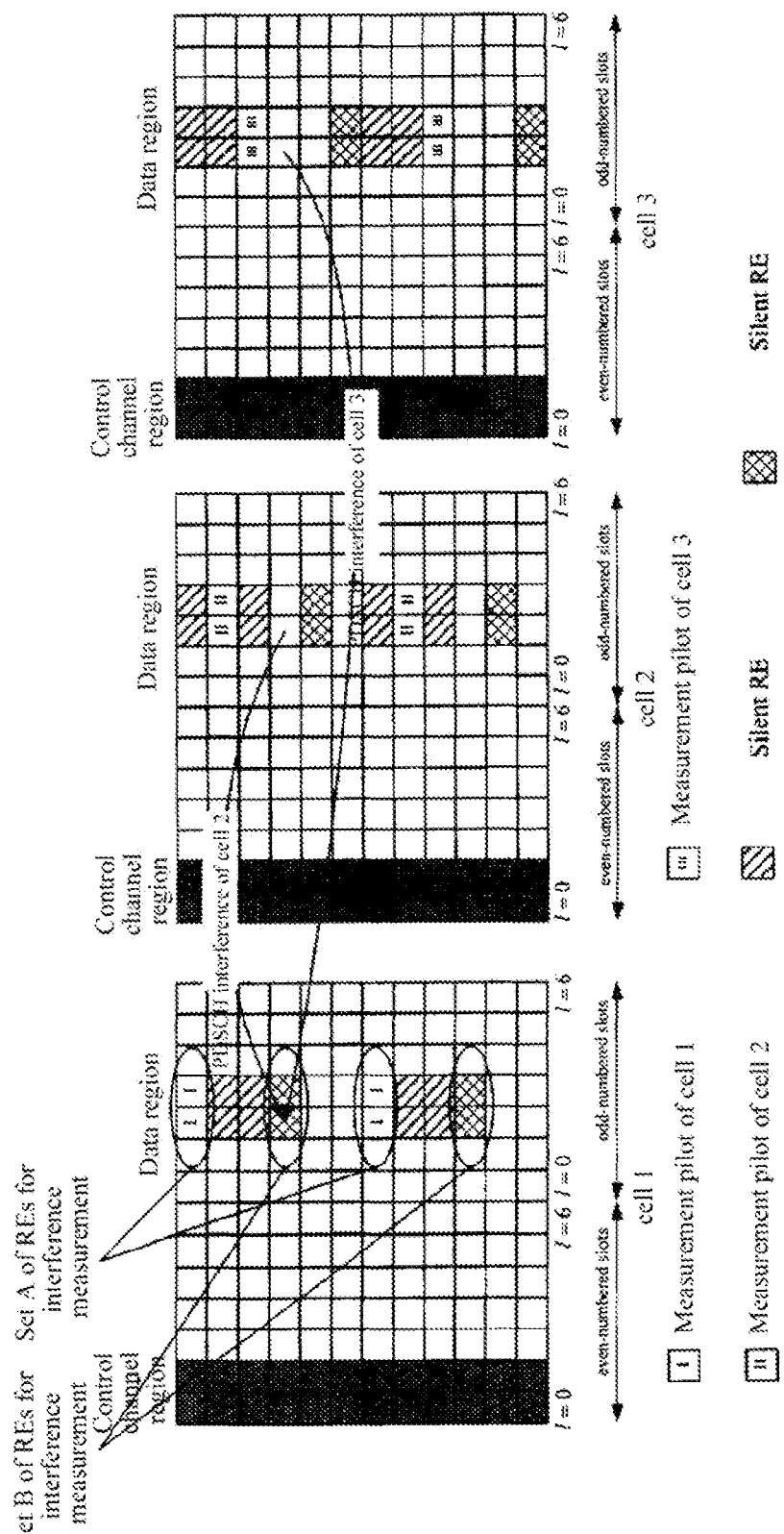
FIG. 7 to FIG. 9 are schematic diagrams of four sets of REs for interference measurement in embodiments of the invention.
Figure 8:
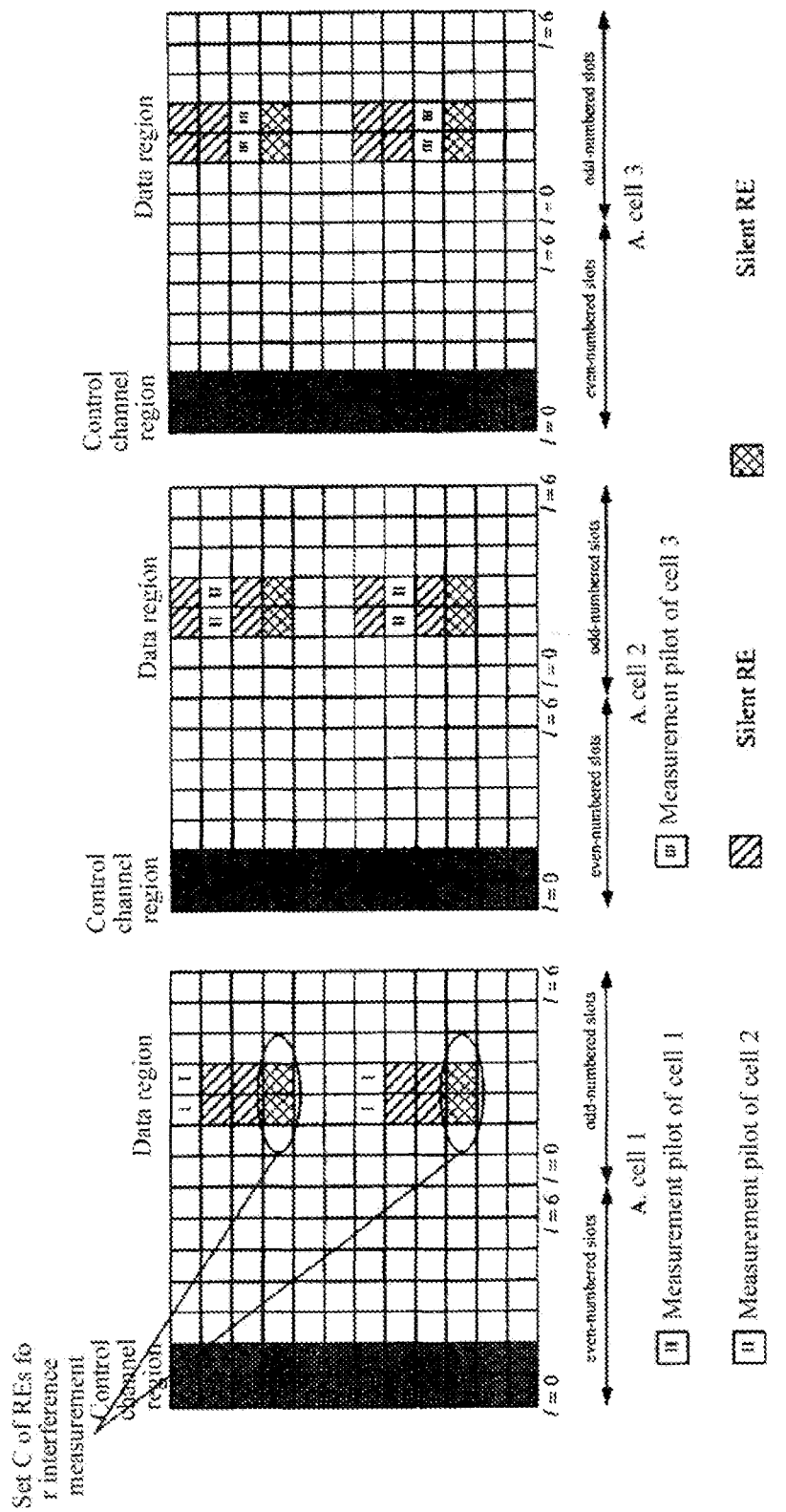
Figure 9:
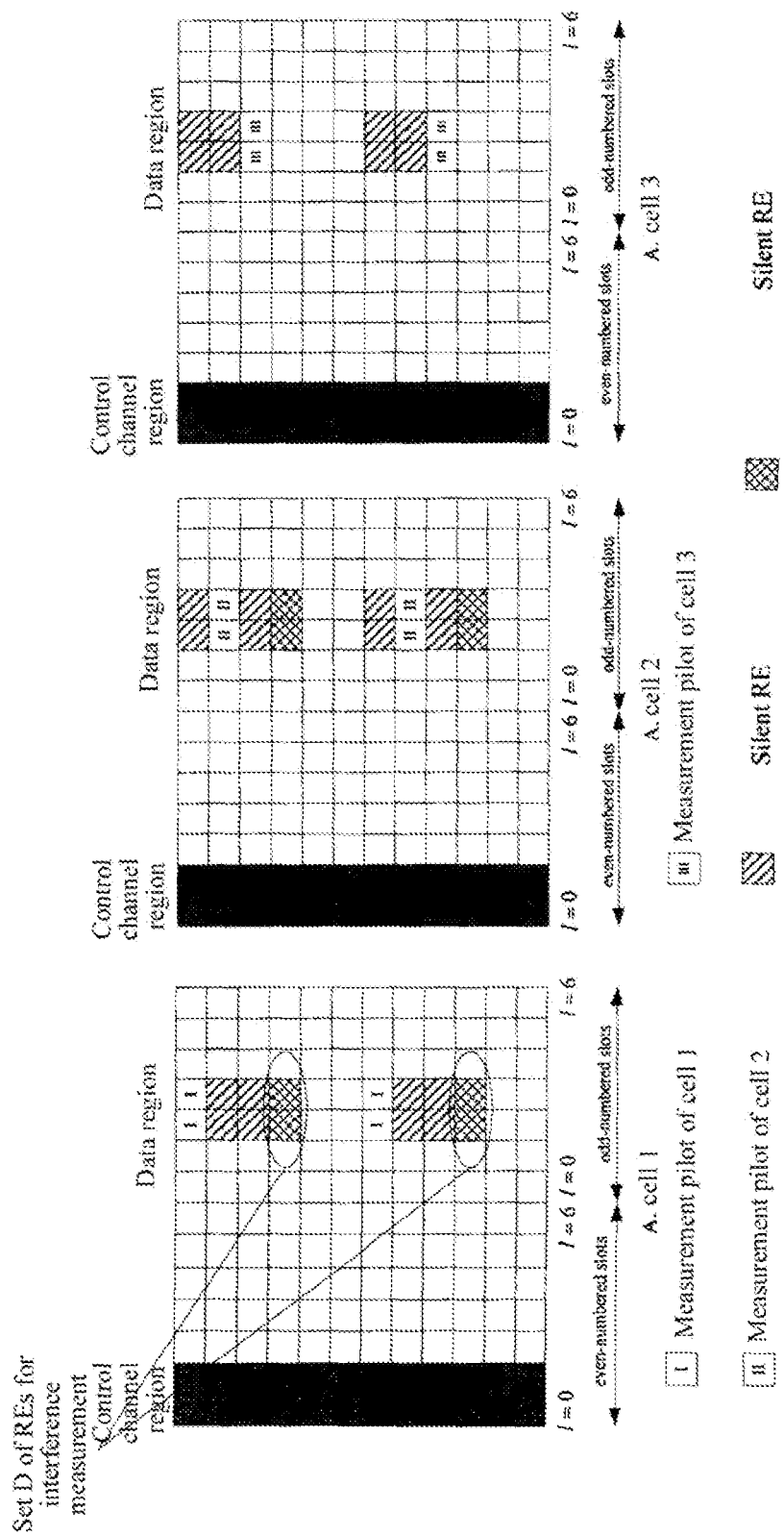

Then the first apparatus particularly performs one or any combination of the following operations in the setting process:

A corresponding set of REs for interference measurement is set according to corresponding REs on which the first apparatus in the measurement set transmits measurement pilots, e.g., a set A of REs for interference measurement illustrated in FIG. 7;

A corresponding set of REs for interference measurement is set according to corresponding REs on which both of the second apparatuses in the measurement set transmit data, e.g., a set B of REs for interference measurement illustrated in FIG. 7, also referred to as silent REs;

A corresponding set of REs for interference measurement is set according to corresponding REs on which neither of the second apparatuses in the measurement set transmits data, e.g., a set C of REs for interference measurement illustrated in FIG. 8, also referred to as silent REs; and A corresponding set of REs for interference measurement is set according to corresponding REs on which at least one of the second apparatuses in the measurement set transmits no data, e.g., a set D of REs for interference measurement illustrated in FIG. 9, also referred to as silent REs.

In this embodiment, an interference source corresponds to a set of REs for interference measurement, for example, the set A of REs for interference measurement corresponds to an interference source which results in interference from other than the cell 1, the cell 2 and the cell 3 (that is, the measurement set); the set B of REs for interference measurement corresponds to an interference source which results in interference from other than the cell 1; the set C of REs for interference measurement corresponds to an interference source which also results in interference from other than the cell 1, the cell 2 and the cell 3 (that is, interference from other than the measurement set); and the set D of REs for interference measurement corresponds to an interference source which results in interference from other than the cell 1 and the cell 2. Furthermore if a set of REs for interference measurement includes REs on which the current cell transmits measurement pilots, then the measurement pilot are transmitted normally without influencing an interference measurement result, where the measurement pilots to be transmitted also include measurement pilots in the cell 2 and the cell 3 in addition to the measurement pilots in the cell 1 (i.e., a serving cell). For example, with the set A of REs for interference measurement, the measurement pilots of the cell 1 are transmitted normally without influencing an interference measurement result; and in another example, if REs on which the coordinating cells transmit the measurement pilots are set in the cell 1 to silent REs which are set as a set of REs for interference measurement, then the measurement pilots of the cell 2 and the cell 3 on the REs at corresponding locations are also transmitted normally without influencing an interference measurement result.

In a practical application, in order to ensure the accuracy in configuration of the sets of REs for interference measurement, before performing configuration, the first apparatus needs to communicate with the respective apparatus in the measurement set and coordinates configuration of the sets of REs for interference measurement of each other to thereby ensure that the user equipment can perform accurate interference measurement according to the sets of REs for interference measurement.

Preferred embodiments of the invention will be described below in details with reference to the drawings.

Figure 10:
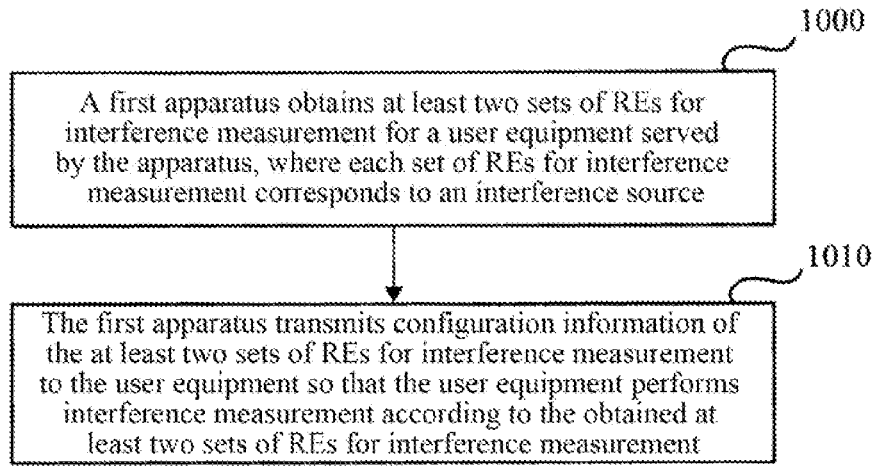
FIG. 10 is a flow chart of a first apparatus notifying a user equipment of a set of REs for interference measurement according to an embodiment of the invention.

Referring to FIG. 10, a first apparatus instructs a user equipment to perform interference measurement in the following particular flow in an embodiment of the invention:

Step 1000: A first apparatus obtains at least two sets of REs for interference measurement for a user equipment served by the first apparatus, where each set of REs for interference measurement corresponds to an interference source.

In a practical application, the first apparatus can configure the user equipment with different sets of REs for interference measurement with respect to different demands for interference measurement. Assumed in a measurement set, the first apparatus corresponds to a cell 1, and two second apparatuses correspond respectively to a cell 2 and a cell 3.

Taking FIG. 7 as an example, the respective apparatuses in the measurement set correspond respectively to the cell 1, the cell 2 and the cell 3. The first apparatus configures the user equipment with two sets of REs for interference measurement, i.e., a set A of REs for interference measurement and a set B of REs for interference measurement respectively. For the set A of REs for interference measurement, measurement pilots of the first apparatus in the cell 1 are included, and the second apparatuses in the cell 2 and the cell 3 configure silent REs respectively at corresponding locations where no data is transmitted, so interference measured by the user equipment on the set A of REs for interference measurement is interference from other than the measurement set. For the set B of REs for interference measurement, the second apparatuses in the cell 2 and the cell 3 will transmit downlink data at corresponding locations, so interference measured by the user equipment on the set B of REs for interference measurement is interference from other than the first apparatus in the cell 1.

Taking FIG. 8 as an example, for the set C of REs for interference measurement, the second apparatuses in the cell 2 and the cell 3 configure silent REs respectively at corresponding locations, so interference measured by the user equipment on the set C of REs for interference measurement is interference from other than the measurement set.

The UE can measure interference from other than the measurement set according to both the set A of REs for interference measurement and the set C of REs for interference measurement, while the difference therebetween lies in that the set A of REs for interference measurement includes measurement pilots of the first apparatus in the cell 1, and the UE needs to firstly estimate channel information from a pilot signal and then reconstruct the received pilot signal and next subtract the reconstructed pilot signal from a received signal to derive an interference and noise signal to thereby obtain power of interference and noise as an interference measurement result; and neither of the second apparatuses in the measurement set transmits a signal on the set C of REs for interference measurement, and the UE only needs to calculate received power on the set C of REs for interference measurement to thereby obtain power of interference and noise.

This example has been described taking power of interference and noise as an example. In a practical application, if the user equipment is provided with more than one receive antenna, then the user equipment can estimate an autocorrelation matrix or a covariance matrix of interference on a set of REs for interference measurement and calculate a CQI from the autocorrelation matrix or a covariance matrix.

Taking FIG. 10 as an example, for the set D of REs for interference measurement, the second apparatus in the cell 2 configures silent REs at corresponding locations, and the second apparatus in the cell 3 transmits data normally at corresponding locations, so interference measured by the user equipment on the set D of REs for interference measurement is interference from other than the cell 1 and the second apparatus in the second cell 2.

In this embodiment, in FIG. 7 to FIG. 9, only the part of each figure corresponding to the cell 1 relates to RE configuration information of the user equipment in the cell 1, and the parts of the figure corresponding to the cell 2 and the cell 3 relate to RE configuration information of the user equipment respectively in the cell 2 and the cell 3, wherein they are presented together herein in order to describe via comparison more clearly.

Furthermore the configuration information of each set of REs for interference measurement shall include a periodicity, an sub-frame offset, etc., in addition to the locations, the number and the number of groups, of REs. Periodicities and offsets of different sets of REs for interference measurement may be the same or different, and if the periodicities and the offsets are the same, then the different sets of REs for interference measurement are located differently in a sub-frame; a set of REs for interference measurement may be present in a plurality of sub-frames in a period, that is, there may be a plurality of sub-frame offsets; and sets of REs for interference measurement in different sub-frames in a period may be located identically or differently.

Step 1010: The first apparatus transmits configuration information of the obtained at least two sets of REs for interference measurement to the user equipment so that the user equipment performs interference measurement according to the obtained at least two sets of REs for interference measurement.

Figure 11:
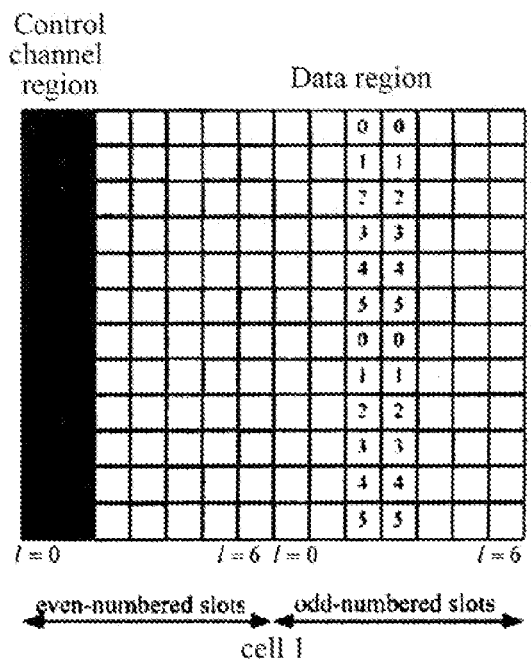
FIG. 11 is a schematic diagram of the locations of REs included in a sub-frame according to an embodiment of the invention.

In this embodiment, preferably the first apparatus can notify in a bit map the user equipment of the locations of the sets of REs for interference measurement in a sub-frame; and if REs are configured in a sub-frame by way of example, then reference is made to FIG. 11 where:

All of available REs in a sub-frame are divided into several groups of REs, where identically numbered REs are grouped together, for example, four REs numbered "1" are grouped together, and thus the available REs are grouped into six groups in total; and thereafter 1 bit is used to indicate whether each group of REs belongs to a set of REs for interference measurement, so six bits are needed to indicate the locations of a set of REs for interference measurement in the sub-frame, for examples, six bits which are {0, 1, 1, 0, 0, 0} indicate that four REs numbered "1" and four REs numbered "2" belong to a currently configured set of REs for interference measurement; and of course, the first apparatus can alternatively notify of the locations of the set of REs for interference measurement in the sub-frame by their index numbers. As illustrated in FIG. 7, for example, assumed a set of REs for interference measurement is only allowed to include one group of REs, then the first apparatus only needs three bits to indicate the index number of the group of REs. In a practical application, the number, the locations and the number of groups, of REs included in each set can be optimized and designed flexibly dependent upon an application environment, and a repeated description thereof will be omitted here.

Of course, in some case, a set of REs for interference measurement can be configured with reference to configuration information of MUTING REs, for example, REs included in the set of REs for interference measurement can be a subset of MUTING REs, and at this time, the locations of the set of REs for interference measurement in a sub-frame can be determined among the MUTING REs in a bitmap or by their index numbers, and a repeated description thereof will be omitted here.

In this embodiment, the first apparatus can perform the step 1010 in the (including but not limited thereto) following three schemes:

1. After the first apparatus transmits the configuration information of the at least two sets of REs for interference measurement to the user equipment, it is not necessary for the user equipment to perform interference measurement immediately according to the received sets of REs for interference measurement, but the first apparatus transmits an indicator to the user equipment according to a measurement requirement to instruct the user equipment to select a part or all of the obtained at least two sets of REs for interference measurement to perform interference measurement.

In a practical application, the first apparatus can indicate a set of REs for interference measurement actually to be used for interference measurement to the user equipment in higher-layer signaling, and specifically the first apparatus carries, in the higher-layer signaling, several bits indicating the index of the set of REs for interference measurement actually to be used for interference measurement (i.e., the index number of the set) according to a current transmission mode of the user equipment, and the user equipment knows from the index the set of REs for interference measurement actually to be used for interference measurement. For example, if the current transmission mode of the user equipment is Joint Transmission (JT), then the first apparatus instructs the user equipment to use a set of REs for interference measurement on which interference from other than the measurement set can be measured; if the current transmission mode of the user equipment is Coordinated Scheduling (CS/CB), then the first apparatus instructs the user equipment to use a set of REs for interference measurement on which interference from other than the interference-coordinating cells can be measured, and so on, and a repeated description thereof will be omitted here.

On the other hand, the first apparatus can alternatively indicate a set of REs for interference measurement actually to be used for interference measurement to the user equipment over Physical Downlink Control Channel (PDCCH) signaling, and specifically the first apparatus can add several bits to Downlink Control Information (DCI) carried in the PDCCH signaling to indicate the index of the set of REs for interference measurement actually to be used for interference measurement, or the first apparatus can indicate the set of REs for interference measurement actually to be used for interference measurement in a bitmap in the DCI carried in the PDCCH signaling, for example, the first apparatus configures the user equipment with four sets of REs for interference measurement in total and then indicates whether the respective sets of REs for interference measurement are actually to be used for interference measurement respectively in four bits in a bitmap.

2. After the first apparatus transmits the configuration information of the at least two sets of REs for interference measurement to the user equipment, it is not necessary for the user equipment to perform interference measurement immediately according to the obtained sets of REs for interference measurement, but the user equipment selects a part or all of the obtained at least two sets of REs for interference measurement in a manner as prescribed with the network side to perform interference measurement. A specific operation scheme of the user equipment will be further described below in details in a subsequent flow.

3. After the first apparatus transmits the configuration information of the at least two sets of REs for interference measurement to the user equipment, it is not necessary for the user equipment to perform interference measurement immediately according to the obtained sets of REs for interference measurement, but the user equipment selects a part or all of the obtained at least two sets of REs for interference measurement in a locally configured manner to perform interference measurement. A specific operation scheme of the user equipment will be further described below in details in a subsequent flow.

Figure 12:
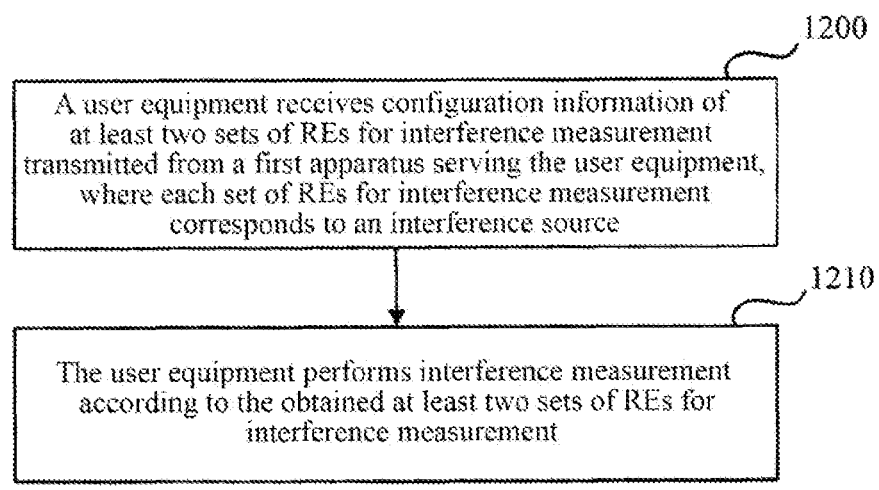
FIG. 12 is a flow chart of a user equipment performing interference measurement based upon a set of REs for interference measurement according to an embodiment of the invention.

Based upon the forgoing embodiment, referring to FIG. 12, a user equipment performs interference measurement based upon a set of REs for interference measurement in the following particular flow in an embodiment of the invention:

Step 1200: A user equipment receives configuration information of at least two sets of REs for interference measurement transmitted from a first apparatus serving the user equipment, where each set of REs for interference measurement corresponds to an interference source.

In this embodiment, the four situations illustrated in FIG. 7 to FIG. 9 still apply to the sets of REs for interference measurement configured for the user equipment by the first apparatus, and particularly:

Taking FIG. 7 as an example, the measurement set includes the first apparatus corresponding to a cell 1 and second apparatuses corresponding respectively to a cell 2 and a cell 3. The first apparatus configures the user equipment with two sets of REs for interference measurement which are a set A of REs for interference measurement and a set B of REs for interference measurement respectively. For the set A of REs for interference measurement, measurement pilots of the first apparatus in the cell 1 are included, and the second apparatuses in the cell 2 and the cell 3 configure silent REs respectively at corresponding locations where no data is transmitted, so interference measured by the user equipment on the set A of REs for interference measurement is interference from other than the measurement set. For the set B of REs for interference measurement, the second apparatuses in the cell 2 and the cell 3 will transmit downlink data at corresponding locations, so interference measured by the user equipment on the set B of REs for interference measurement is interference from other than the first apparatus in the cell 1.

Taking FIG. 8 as an example, for the set C of REs for interference measurement, the second apparatuses in the cell 2 and the cell 3 configure silent REs respectively at corresponding locations, so interference measured by the user equipment on the set C of REs for interference measurement is interference from other than the measurement set.

Taking FIG. 9 as an example, for the set D of REs for interference measurement, the second apparatus in the cell 2 configures silent REs at corresponding locations, and the second apparatus in the cell 3 transmits data normally at corresponding locations, so interference measured by the user equipment on the set D of REs for interference measurement is interference from other than the cell 1 and the second apparatus in the second cell 2.

Step 1210: The user equipment performs interference measurement according to the obtained at least two sets of REs for interference measurement.

In this embodiment, the user equipment can perform the step 1210 in the (including but not limited thereto) following three schemes:

1. After the configuration information of the at least two sets of REs for interference measurement transmitted from the first apparatus is received, upon reception of an indicator transmitted from the first apparatus according to a measurement requirement, the user equipment selects a part or all of the obtained at least two sets of REs for interference measurement in response to the indicator to perform interference measurement.

At this time, the indicator received by the user equipment can be higher-layer signaling, transmitted from the first apparatus, in which several bits are carried to indicate the index of a set of REs for interference measurement actually to be used for interference measurement (i.e., the index number of the set), and the user equipment knows from the index the set of REs for interference measurement actually to be used for interference measurement.

On the other hand, the indicator received by the user equipment can alternatively be PDCCH signaling, transmitted from the first apparatus, carrying DCI to which several bits are added to indicate the index of the set of REs for interference measurement actually to be used for interference measurement, or the set of REs for interference measurement actually to be used for interference measurement is indicated in a bitmap in the DCI carried in the PDCCH signaling, and the user equipment can hereby know the set of REs for interference measurement actually to be used for interference measurement.

2. After the configuration information of the at least two sets of REs for interference measurement transmitted from the first apparatus is received, the user equipment selects a part or all of the obtained at least two sets of REs for interference measurement in a manner as prescribed by the user equipment with the network side to perform interference measurement.

For example, the user equipment prescribes with the network side that the user equipment determines the set of REs for interference measurement actually to be used for interference measurement according to a CQI reference resource configured locally or at the network side, and particularly:

The user equipment obtains the CQI reference resource preset locally or configured at the network side, where the CQI reference resource includes a preset number of sets of REs for interference measurement; and The user equipment judges whether at least one of the at least two sets of REs for interference measurement obtained from the first apparatus is included in the CQI reference resource, and if so, then the user equipment determines the set of REs for interference measurement included in the CQI reference resource as the set of REs for interference measurement actually to be used for interference measurement; otherwise, the user equipment determines the closest set of REs for interference measurement, to the CQI reference resource in terms of the times when they are set, as the set of REs for interference measurement actually to be used for interference measurement.

In another example, the user equipment prescribes with the network side that each of the at least two sets of REs for interference measurement obtained from the first apparatus is selected sequentially at a preset periodicity as the set of REs for interference measurement actually to be used for interference measurement.

Thus the user equipment can change periodically the set of REs for interference measurement to perform interference measurement, and if the first apparatus indicates a number N of sets of REs for interference measurement, then the user equipment performs and reports interference measurement with these sets of REs for interference measurement in a round robin manner and thus can obtain interference measurement results with respect to a number of interference sources, so that the network side can hereby know the levels of interference of the interference sources corresponding to the respective sets of REs for interference measurement and thus can be given more comprehensive knowledge of an interference condition of a network environment.

The user equipment can derive corresponding channel state information (e.g., a CQI) from an interference measurement result (e.g., I+N0) and report the channel state information to the network side after performing interference measurement on the set of REs for interference measurement actually to be used for interference measurement as selected in the first and second schemes.

On the other hand, the user equipment can alternatively perform interference measurement on each of the obtained at least two sets of REs for interference measurement, derive corresponding channel state information from an interference measurement result corresponding to the set of REs for interference measurement actually to be used for interference measurement as selected in the first and second schemes and report the channel state information to the network side. For example, the user equipment performs interference measurement on all the sets of REs for interference measurement and then selects the interference measurement quantity to be used actually, according to the first and second schemes when actually calculating a CQI and other information to he fed back.

3. After the configuration information of the at least two sets of REs for interference measurement transmitted from the first apparatus is received, the user equipment selects a part or all of the obtained at least two sets of REs for interference measurement in a locally pre-configured manner to perform interference measurement.

For example the user equipment determines all the obtained at least two sets of REs for interference measurement as sets of REs for interference measurement actually to be used for interference measurement, that is, the user equipment will perform interference measurement on all the obtained sets of REs for interference measurement.

Correspondingly after interference measurement is performed on the sets of REs for interference measurement actually to be used for interference measurement as selected in the third scheme, the user equipment can obtain corresponding channel state information from an interference measurement result characterizing the highest or lowest interference and report the channel state information to the network side; or calculate the average of obtained respective interference measurement results, derive corresponding channel state information from the average and report the channel state information to the network side; or select any one of the obtained respective interference measurement results, derive corresponding channel state information and report the channel state information to the network side.

4. After the configuration information of the at least two sets of REs for interference measurement transmitted from the first apparatus is received, the user equipment selects a part or all of the sets of REs for interference measurement according to a pre-configured correspondence relationship between CQIs to be reported and the sets of REs for interference measurement to perform interference measurement.

For example, the network side configures a CQI reported from the user equipment to correspond to a set of REs for interference measurement, and then the user equipment performs interference measurement with the set of REs for interference measurement and calculates from an obtained interference estimation value and report the corresponding CQI.

The network side can configure the user equipment to report a plurality of CQIs, each of which corresponds to a set of REs for interference measurement, and the user equipment estimates interference respectively on the different sets of REs for interference measurement to calculate the corresponding CQIs. A plurality of CQIs can correspond to the same set of REs for interference measurement. A correspondence relationship between a plurality of CQIs and a plurality of sets of REs for interference measurement can be preset or can be configured for the user equipment at the network side.

Figure 13:
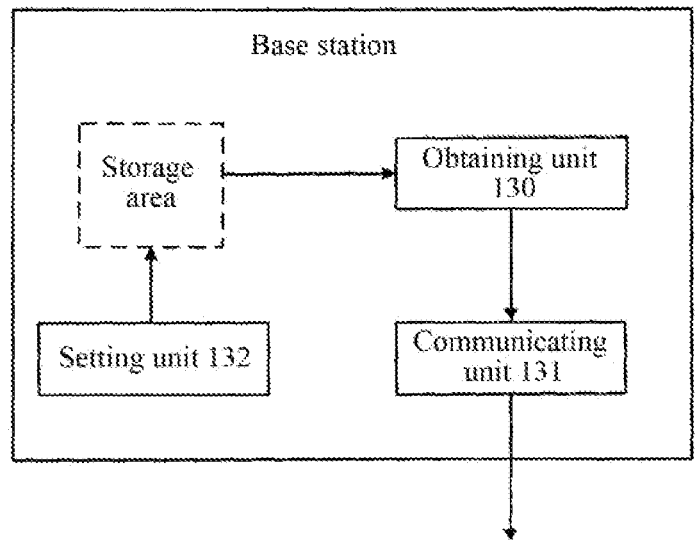
FIG. 13 is a schematic functionally structural diagram of a first apparatus according to an embodiment of the invention.
Figure 14:
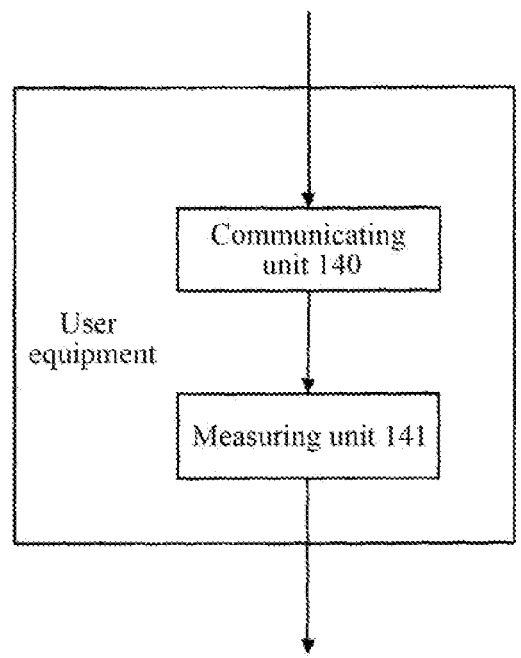
FIG. 14 is a schematic functionally structural diagram of user equipment according to an embodiment of the invention.

Based upon the foregoing embodiments, referring to FIG. 13 and FIG. 14, a first apparatus includes an obtaining unit 130 and a communicating unit 131 in an embodiment of the invention.

The obtaining unit 130 is configured to obtain at least two sets of REs for interference measurement for a user equipment served by the first apparatus, where each set of REs for interference measurement corresponds to an interference source; and The communicating unit 131 configured to transmit configuration information of the at least two sets of REs for interference measurement to the user equipment so that the user equipment performs interference measurement according to the obtained at least two sets of REs for interference measurement.

The foregoing first apparatus further include a setting unit 132 configured to set the at least two sets of REs for interference measurement for the user equipment served by the first apparatus.

A user equipment includes a communicating unit 140 and a measuring unit 141.

The communicating unit 140 is configured to receive configuration information of at least two sets of REs for interference measurement transmitted from a first apparatus serving the user equipment, where each set of REs for interference measurement corresponds to an interference source; and The measuring unit 141 is configured to perform interference measurement according to the obtained at least two sets of REs for interference measurement.

Those skilled in the art shah appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of interference measurement in coordinated multipoint transmission, the method comprising:
    setting, by a first apparatus, two sets of Resource Elements (REs) for interference measurement for a user equipment served by the first apparatus, wherein each set of REs for interference measurement corresponds to one kind of interference source, and different sets of REs for interference measurement correspond to two kinds of interference sources; and
    transmitting, by the first apparatus, configuration information of the two sets of REs for interference measurement to the user equipment so that the user equipment performs interference measurement according to the two sets of REs for interference measurement;
    wherein transmitting, by the first apparatus, the configuration information of the two sets of REs for interference measurement to the user equipment comprises:
    after the first apparatus transmits the configuration information of the two sets of REs for interference measurement to the user equipment, transmitting, by the first apparatus, an indicator to the user equipment according to a measurement requirement to instruct the user equipment to use a part or all of the two sets of REs for interference measurement to perform interference measurement.

2. The method according to claim 1, wherein the two sets of REs for interference measurement is set by steps of:
    determining, by the first apparatus, a measurement set of the user equipment, wherein the measurement set includes the first apparatus transmitting service data to the user equipment and one second apparatus participating in coordinated multipoint transmission to the user equipment; and
    setting, by the first apparatus, the two sets of REs for interference measurement according to various kinds of interference sources corresponding to the measurement set, so that the user equipment performs interference measurement on REs included in the two sets of REs for interference measurement.

3. The method according to claim 2, wherein setting, by the first apparatus, the two sets of REs for interference measurement comprises one or any combination of operations of:
    setting, by the first apparatus, a corresponding set of REs for interference measurement according to corresponding REs on which the first apparatus in the measurement set transmits measurement pilots;
    setting, by the first apparatus a corresponding set of REs for interference measurement according to corresponding REs on which all of the second apparatuses in the measurement set transmit data;
    setting, by the first apparatus a corresponding set of REs for interference measurement according to corresponding REs on which none of the second apparatuses in the measurement set transmits data; and
    setting, by the first apparatus a corresponding set of REs for interference measurement according to corresponding REs on which one of the second apparatuses in the measurement set transmits no data.

4. The method according to claim 1, wherein transmitting, by the first apparatus, the configuration information of the two sets of REs for interference measurement to the user equipment comprises:
    after the first apparatus transmits the configuration information of the two sets of REs for interference measurement to the user equipment, selecting, by the user equipment, a part or all of the two sets of REs for interference measurement in a manner as prescribed with the network side to perform interference measurement; or
    after the first apparatus transmits the configuration information of the at least two sets of REs for interference measurement to the user equipment, selecting, by the user equipment, a part or all of the two sets of REs for interference measurement in a locally configured manner to perform interference measurement; or
    after the first apparatus transmits the configuration information of the two sets of REs for interference measurement to the user equipment, selecting, by the user equipment, a part or all of the sets of REs for interference measurement according to a pre-configured correspondence relationship between Channel Quality Indicators (CQIs) to be reported and the sets of REs for interference measurement to perform interference measurement.

5. A method of interference measurement in coordinated multipoint transmission, the method comprising:
    receiving, by a user equipment, configuration information of two sets of Resource Elements (REs) for interference measurement transmitted from a first apparatus serving the user equipment, wherein each set of REs for interference measurement corresponds to one kind of interference source, and different sets of REs for interference measurement correspond to two kinds of interference sources; and
    performing, by the user equipment, interference measurement according to the two sets of REs for interference measurement;
    wherein performing, by the user equipment, interference measurement according to the two sets of REs for interference measurement comprises:
    after receiving the configuration information of the two sets of REs for interference measurement transmitted from the first apparatus, upon reception of an indicator transmitted from the first apparatus according to a measurement requirement, using, by the user equipment, a part or all of the two sets of REs for interference measurement in response to the indicator to perform interference measurement.

6. The method according to claim 5, wherein performing, by the user equipment, interference measurement according to the two sets of REs for interference measurement comprises:

after receiving the configuration information of the two sets of REs for interference measurement transmitted from the first apparatus, selecting, by the user equipment, a part or all of the two sets of REs for interference measurement in a manner as prescribed by the user equipment with the network side to perform interference measurement; or after receiving the configuration information of the two sets of REs for interference measurement transmitted from the first apparatus, selecting, by the user equipment, a part or all of the two sets of REs for interference measurement in a locally pre-configured manner to perform interference measurement; or after receiving the configuration information of the two sets of REs for interference measurement transmitted from the first apparatus, selecting, by the user equipment, a part or all of the sets of REs for interference measurement according to a pre-configured correspondence relationship between Channel Quality Indicators (CQIs) to be reported and the sets of REs for interference measurement to perform interference measurement.

7. The method according to claim 6, wherein after receiving the configuration information of the two sets of REs for interference measurement transmitted from the first apparatus, selecting, by the user equipment, a part or all of the two sets of REs for interference measurement in a manner as prescribed by the user equipment with the network side to perform interference measurement comprises:

obtaining, by the user equipment, a Channel Quality Indicator (CQI) reference resource preset locally or configured at the network side, wherein the CQI reference resource includes a preset number of sets of REs for interference measurement; judging, by the user equipment, whether one of the two sets of REs for interference measurement is included in the CQI reference resource, and if so, then determining, by the user equipment, the set of REs for interference measurement included in the CQI reference resource as the set of REs for interference measurement actually to be used for interference measurement; otherwise, determining, by the user equipment, closest set of REs for interference measurement, to the CQI reference resource in terms of the times when they are set, as the set of REs for interference measurement actually to be used for interference measurement; or selecting, by the user equipment, each of the received two sets of REs for interference measurement sequentially at a preset periodicity as the set of REs for interference measurement actually to be used for interference measurement.

8. The method according to claim 6, wherein the user equipment derives corresponding channel state information from an interference measurement result and reports the channel state information to the network side after performing interference measurement based on the set of REs for interference measurement actually to be used for interference measurement; or the user equipment performs interference measurement on each of the two sets of REs for interference measurement, derives corresponding channel state information from an interference measurement result corresponding to the set of REs for interference measurement actually to be used for interference measurement and reports the channel state information to the network side.

9. The method according to claim 6, wherein after receiving the configuration information of the two sets of REs for interference measurement transmitted from the first apparatus, selecting, by the user equipment, a part or all of the two sets of REs for interference measurement in a locally pre-configured manner to perform interference measurement comprises:

determining, by the user equipment, all the two sets of REs for interference measurement as sets of REs for interference measurement actually to be used for interference measurement.

10. The method according to claim 9, wherein after the user equipment performs interference measurement based upon the set of REs for interference measurement actually to be used for interference measurement, the method further comprises:

obtaining, by the user equipment, corresponding channel state information from an interference measurement result characterizing the highest or lowest interference and reporting the channel state information to the network side; or calculating, by the user equipment, average of obtained respective interference measurement results, deriving corresponding channel state information from the average and reporting the channel state information to the network side; or selecting, by the user equipment, any one of the obtained respective interference measurement results, deriving corresponding channel state information and reporting the channel state information to the network side.

11. An apparatus for interference measurement in coordinated multipoint transmission, the apparatus comprising:

a processor; and a non-transitory computer readable storage medium with an executable program stored thereon, wherein the program instructs the processor to perform operations:

setting two sets of Resource Elements (REs) for interference measurement for a user equipment served by the first apparatus, wherein each set of REs for interference measurement corresponds to one kind of interference source, and different sets of REs for interference measurement correspond to two kinds of interference sources; and transmitting configuration information of the two sets of REs for interference measurement to the user equipment so that the user equipment performs interference measurement according to the two sets of REs for interference measurement;

wherein the processor configured to transmit the configuration information of the two sets of REs for interference measurement to the user equipment so that the user equipment performs interference measurement according to the two sets of REs for interference measurement is configured to perform operations:

after transmitting the configuration information of the two sets of REs for interference measurement to the user equipment, transmitting an indicator to the user equipment according to a measurement requirement to instruct the user equipment to use a part or all of the two sets of REs for interference measurement to perform interference measurement.

12. The apparatus according to claim 11, wherein the processor is configured to set the two sets of REs for interference measurement by: determining a measurement set of the user equipment, wherein the measurement set includes the apparatus transmitting service data to the user equipment and one second apparatus participating in coordinated multipoint transmission to the user equipment; and
setting the two sets of REs for interference measurement according to various kinds of interference sources corresponding to the measurement set so that the user equipment can perform interference measurement on REs included in the at least two sets of REs for interference measurement.

13. The apparatus according to claim 12, wherein the processor is configured to set the two sets of REs for interference measurement according to the various kinds of interference sources corresponding to the measurement set so that the user equipment can perform interference measurement on the REs included in the two sets of REs for interference measurement comprises one or any combination of operations of:
setting a corresponding set of REs for interference measurement according to corresponding REs on which the first apparatus in the measurement set transmits measurement pilots;
setting a corresponding set of REs for interference measurement according to corresponding REs on which all of the second apparatuses in the measurement set transmit data;
setting a corresponding set of REs for interference measurement according to corresponding REs on which none of the second apparatuses in the measurement set transmits data; and
setting a corresponding set of REs for interference measurement according to corresponding REs on which one of the second apparatuses in the measurement set transmits no data.

14. The apparatus according to claim 11, wherein the processor configured to transmit the configuration information of the two sets of REs for interference measurement to the user equipment so that the user equipment performs interference measurement according to the two sets of REs for interference measurement is configured to perform operations:
after transmitting the configuration information of the two sets of REs for interference measurement to the user equipment, having the user equipment select a part or all of the two sets of REs for interference measurement in a manner as prescribed with the network side to perform interference measurement; or
after transmitting the configuration information of the two sets of REs for interference measurement to the user equipment, having the user equipment select a part or all of the two sets of REs for interference measurement in a locally configured manner to perform interference measurement; or
after transmitting the configuration information of the two sets of REs for interference measurement to the user equipment, having the user equipment select a part or all of the sets of REs for interference measurement according to a pre-configured correspondence relationship between Channel Quality Indicators (CQIs) to be reported and the sets of REs for interference measurement to perform interference measurement.

15. An apparatus for interference measurement in coordinated multipoint transmission, the apparatus comprising:
a processor; and
a non-transitory computer readable storage medium with an executable program stored thereon, wherein the program instructs the processor to perform operations:
receiving configuration information of two sets of Resource Elements (REs) for interference measurement transmitted from a first apparatus serving the apparatus, wherein each set of REs for interference measurement corresponds to one kind of interference source, and different sets of REs for interference measurement correspond to two kinds of interference sources; and
performing interference measurement according to the two sets of REs for interference measurement;
wherein the processor configured to perform interference measurement according to the two sets of REs for interference measurement is configured to perform operations:
after receiving the configuration information of the two sets of REs for interference measurement transmitted from the first apparatus, upon reception of an indicator transmitted from the first apparatus according to a measurement requirement, using a part or all of the two sets of REs for interference measurement in response to the indicator to perform interference measurement.

16. The apparatus according to claim 15, wherein the processor configured to perform interference measurement according to the at least two sets of REs for interference measurement is configured to perform operations:
after receiving the configuration information of the two sets of REs for interference measurement transmitted from the first apparatus, selecting a part or all of the two sets of REs for interference measurement in a manner as prescribed by the apparatus with the network side to perform interference measurement; or
after receiving the configuration information of the two sets of REs for interference measurement transmitted from the first apparatus, selecting a part or all of the two sets of REs for interference measurement in a locally pre-configured manner to perform interference measurement; or
after receiving the configuration information of the two sets of REs for interference measurement transmitted from the first apparatus, selecting a part or all of the sets of REs for interference measurement according to a pre-configured correspondence relationship between Channel Quality Indicators (CQIs) to be reported and the sets of REs for interference measurement to perform interference measurement.

17. The apparatus according to claim 16, wherein after the processor receives the configuration information of the two sets of REs for interference measurement transmitted from the first apparatus, the processor configured to select a part or all of the two sets of REs for interference measurement in a manner as prescribed by the apparatus with the network side to perform interference measurement is configured to perform operations:
obtaining a Channel Quality Indicator (CQI) reference resource preset locally or configured at the network side, wherein the CQI reference resource includes a preset number of sets of REs for interference measurement; judging whether one of the two sets of REs for interference measurement is included in the CQI reference resource, and if so, then determining the set of REs for interference measurement included in the CQI reference resource as the set of REs for interference measurement actually to be used for interference measurement;

otherwise, determining the closest set of REs for interference measurement, to the CQI reference resource in terms of the times when they are set, as the set of REs for interference measurement actually to be used for interference measurement; or selecting each of the received two sets of REs for interference measurement sequentially at a preset periodicity as the set of REs for interference measurement actually to be used for interference measurement.

18. The apparatus according to claim 16, wherein the processor is configured to derives corresponding channel state information from an interference measurement result and reports the channel state information to the network after performing interference measurement based on the set of REs for interference measurement actually to be used for interference measurement; or the processor is configured to performs interference measurement on each of the two sets of REs for interference measurement, derives corresponding channel state information from an interference measurement result corresponding to the set of REs for interference measurement actually to be used for interference measurement and reports the channel state information to the network side.

19. The apparatus according to claim 16, wherein after the processor receives the configuration information of the two sets of REs for interference measurement transmitted from the first apparatus, the processor configured to select a part or all of the two sets of REs for interference measurement in a locally pre-configured manner to perform interference measurement is configured to perform operations:

determining all the two sets of REs for interference measurement as sets of REs for interference measurement actually to be used for interference measurement.

20. The apparatus according to claim 19, wherein after the processor performs interference measurement based upon the set of REs for interference measurement actually to be used for interference measurement, the processor is further to configured to perform operations:

obtaining corresponding channel state information from an interference measurement result characterizing the highest or lowest interference and reports the channel state information to the network side; or calculating the average of obtained respective interference measurement results, derives corresponding channel state information from the average and reports the channel state information to the network side; or selecting any one of the obtained respective interference measurement results, derives corresponding channel state information and reports the channel state information to the network side.

* * * * *